United States Patent [19]

Dann

[11] Patent Number: 4,617,590
[45] Date of Patent: Oct. 14, 1986

[54] CLAMPING CIRCUIT FOR VIDEO SIGNALS

[75] Inventor: Lynn D. Dann, Rochester, N.Y.

[73] Assignee: Eastman Kodak Company, Rochester, N.Y.

[21] Appl. No.: 697,660

[22] Filed: Feb. 4, 1985

[51] Int. Cl.⁴ .............................................. H04N 9/72
[52] U.S. Cl. .................................... 358/34; 358/21 R
[58] Field of Search ................... 358/21 R, 12, 14, 18, 358/27, 34, 40, 310, 315, 334, 30

[56] References Cited

U.S. PATENT DOCUMENTS

| | | | |
|---|---|---|---|
| 3,267,208 | 8/1966 | Brouard | 178/5.2 |
| 4,114,179 | 9/1978 | Ilieve | 358/34 |
| 4,183,050 | 1/1980 | Tsuchiya et al. | 358/34 |
| 4,220,964 | 9/1980 | Yamagiwa | 358/8 |
| 4,445,152 | 4/1984 | Karlock | 360/33 |
| 4,470,076 | 9/1984 | Aral et al. | 358/312 |

*Primary Examiner*—Michael A. Masinick
*Attorney, Agent, or Firm*—David M. Woods

[57] ABSTRACT

A clamping circuit for use in a line sequential video processor sets separate dc voltage levels for a pair of color difference signals. The respective dc levels serve to identify the sequence of the color difference signals in the line sequential signal. By first setting the voltage offset between the respective levels, the dc voltage levels for both color difference signals are later established by clamping only to every other signal. The clamping circuit includes a monostable multivibrator that generates a clamping pulse only at the onset of every other color difference signal.

5 Claims, 3 Drawing Figures

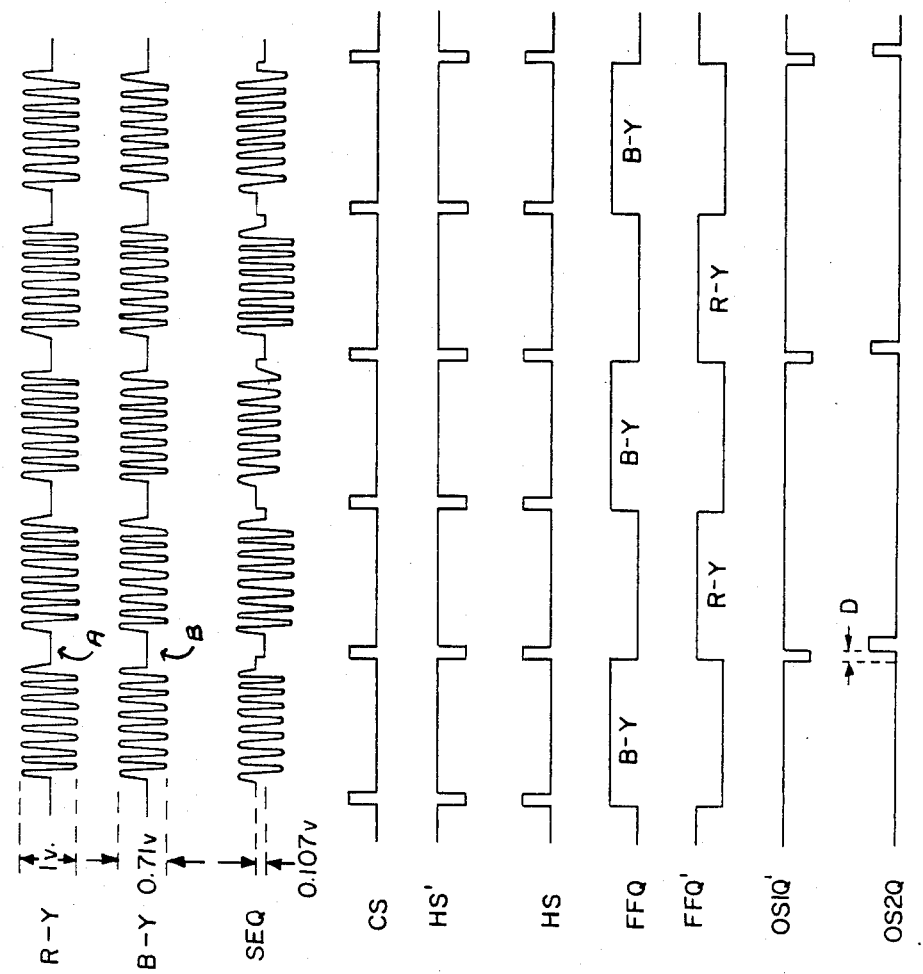

019
CLAMPING CIRCUIT FOR VIDEO SIGNALS

BACKGROUND OF THE INVENTION

1. Field of the Invention

This invention relates to the clamping of a signal to a reference level and in particular to the periodic clamping of a video signal to a reference dc level.

2. Description Relative to the Prior Art

It is necessary, after ac coupling, to restore the dc level of a video signal at selected points in a video circuit. In a video system employing frequency-modulation, for instance, it is important that the dc level be correct prior to the clipping and modulating stages. Otherwise the clipper may attenuate more of the signal than it should and the frequency modulator may produce an output with respect to the wrong frequencies.

Maintenance of correct dc level is of additional significance in the case of a color signal generated from line sequential color difference signals, that is, R-Y (red-luminance) and B-Y (blue-luminance) signals in alternating line sequence: It is necessary to provide some manner of identifying each color difference signal and of maintaining that identification throughout the generation, transmission (or recording) and reception (or playback) of such signals. The identification may be provided by an index signal which is characteristic of the onset of one of the color difference signals (see, for example, the system outlined in U.S. Pat. No. 4,470,076). If the color difference signals modulate the frequency of a carrier, such identification may consist of different rest frequencies for the R-Y and B-Y color difference signals. Since a typical frequency modulator converts a voltage to a frequency, the different rest frequencies may correspond to different dc blanking level voltages for the R-Y and B-Y signals.

A line sequential color signal, moreover, is sensitive to errors in its blanking level because its component signals are significantly different in each new line. For that reason U.S. Pat. No. 4,114,179 suggests a clamping circuit that clamps on each individual line, thus assuring that the dc level is correct for each line. In a system where the blanking level is also the signal identifier, there is further reason to clamp each signal to respective blanking levels prior to clipping and modulating. With separate blanking levels, however, more complex clamping circuitry is required. It is burdensome, furthermore, to clamp a train of signals to alternately varying dc levels since the short existence of each clamping interval (approximately 10.2 microseconds is available within the horizontal blanking period) requires a very fast reacting clamp with virtually no allowance for settling time. In other words, the clamp has but one chance to be on the mark or the system fails.

SUMMARY OF THE INVENTION

These stringent requirements are relaxed according to the invention by a clamping circuit that restores the dc level of a line sequential color signal by utilizing the offset in dc voltage level that distinguishes one color difference signal from another. When the color difference signals are generated, an offset voltage is maintained between them such that one color signal has a predetermined dc level relative to the other color signal. If these dc levels are subsequently lost, due to the effect of ac coupling, then the correct dc level can be established line for line by clamping, not both, but only one color video signal to a dc reference level; the existence of the offset—which is not lost due to its high frequency content—then brings the "unclamped" color signal to its correct dc level.

BRIEF DESCRIPTION OF THE DRAWINGS

A preferred embodiment of the invention will be described with reference to the drawings, in which:

FIG. 3 is a collection of waveform and timing diagrams useful in explaining the operation of the circuit shown by FIG. 2.

DETAILED DESCRIPTION OF THE PREFERRED EMBODIMENT

Because television and video apparatus are well known, the present description will be directed in particular to elements forming part of, or cooperating more directly with, apparatus in accordance with the present invention. Elements not specifically shown or described herein may be selected from those known in the art.

Figure 1:
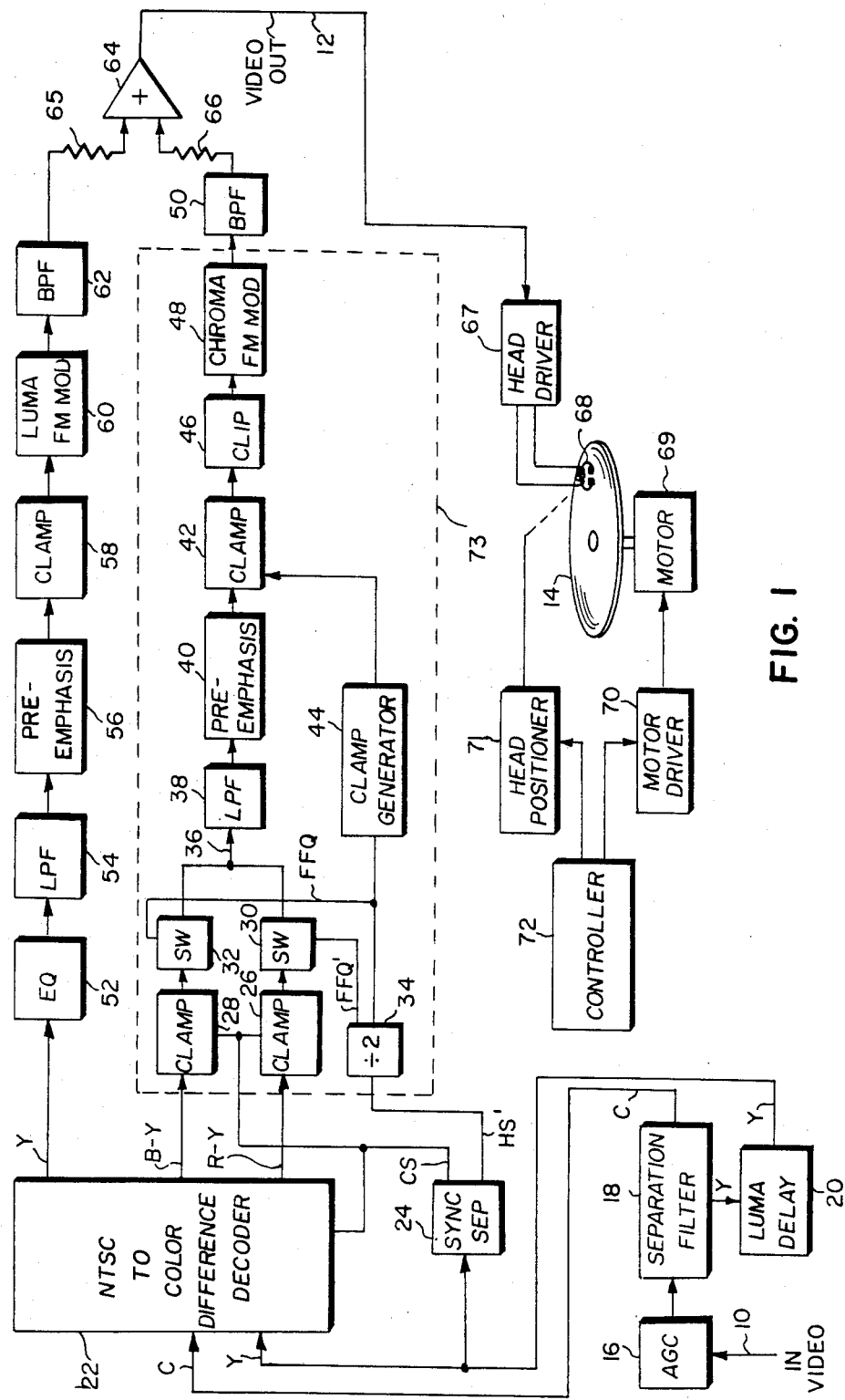
FIG. 1 is a block diagram of a video disk recorder incorporating a clamping circuit according to the invention.

A clamping circuit according to the invention is useful with video apparatus generally, but especially with apparatus that generates a video signal either for transmission (for immediate display) or for recording (for later display). The video disk recorder shown by FIG. 1 is exemplary of such apparatus; it converts an incoming NTSC video signal (VIDEO IN on line 10) into a line sequential signal (VIDEO OUT on line 12) which is recorded upon a magnetic recording disk 14. The incoming video signal is passed through an automatic gain control circuit 16, which provides a fixed level of video output despite a varying input signal level. The chrominance componnet C and the luminance component Y are separated from the composite input signal by a separation filter 18. This filter may comprise, for example, an RLC filter or a comb filter. (In a comb filter, the luminance passband exhibits recurring peaks at multiples of the line frequency and the chrominance passband exhibits recurring peaks at odd multiples of half the line frequency.) The Y signal is delayed in a luminance delay line 20 so that the luminanace Y and chrominance C are provided to a decoder 22 at the same time for further processing. The decoder 22 includes color demodulators for detecting the color signals and a matrix for generating the color difference signals B-Y and R-Y from the Y and C signals (a suitable decoder is a Signetics device number 3563).

The Y signal, which contains the composite synchronization component, is also applied to a sync separator 24. A composite sync signal CS is stripped from the Y signal for timing the decoder 22. A signal HS', which is low only during occurrence of the horizontal synchronizing signal, is also generated by the sync separator 24. The composite sync signal CS enables a pair of clamps 26 and 28, which set the offset voltage between the color difference signals B-Y and R-Y. Since the dc level of each color difference signal serves to identify each signal, the voltage differential (offset) between the signals can also identify each signal. For example, according to the preferred embodiment, an offset voltage of about 107 millivolts identifies the higher level signal as the B-Y signal.

The clamped color difference signals are alternately selected by a pair of switches 30 and 32. These switches are actuated by a pair of output signals FFQ' and FFQ from a divide-by-two circuit 34. The control signal HS' triggers the divide-by-two circuit 34 once for each line. Since the output signals FFQ' and FFQ represent a division of the input signal by two, the circuit 34 triggers respective switches 30 and 32 on alternate lines. The resultant color signal on line 36 is line sequential, that is, it contains a line-by-line color difference alternation of the form

B-Y, R-Y, B-Y, R-Y, B-Y, . . .

This line sequential signal is filtered in a low pass filter 38 and passed to a preemphasis circuit 40, which boosts the voltages corresponding to higher color frequencies.

The line sequential color difference signals B-Y and R-Y on the line 36 have dc components. To preserve these dc components it is necessary to direct-couple the video signals between all stages. However it is commonplace to ac-couple between at least some stages (by using coupling capacitors in series with the signal). Typically, such stages would involve an ac amplifier—such as might be used in the preemphasis circuit 40. Thus the preemphasized signal lacks a dc component, though such component is necessary in order to produce correct frequencies during frequency modulation. A clamping circuit 42, therefore, is provided in order to establish a correct dc component of the line sequential signal. Unlike conventional clamping circuits, however, this circuit sets the dc level for every other line, that is, in the preferred embodiment, at the beginning of the R-Y color difference signal. A clamp pulse is generated by a clamp generator circuit 44 at the onset of each R-Y signal from the FFQ output of the divide-by-two circuit 34. The clamp pulse brings the portion of the R-Y signal corresponding to the composite sync period to a predetermined dc level representing the blanking level. The similar portion of the "unclamped" B-Y signal is then correspondingly brought to its predetermined dc (blanking) level by virtue of the offset between the signals. Although the offset represents a difference between dc levels, the voltage offset itself is an abrupt transition having high frequency content and therefore remains intact after ac coupling. Clamping a two-line signal segment to one dc level therefore sets one line at the clamped dc level and the other line at the same dc level plus (or minus) the offset voltage.

The clamped line sequential signal is clipped in a clipping circuit 46 and then modulates the frequency of a rf carrier applied to a chroma frequency modulator 48. If the dc levels of the line sequential signal are properly set, they will drive the modulator 48 to produce correspondingly different, and identifiable, rest frequencies. That is, acting as a voltage-to-frequency converter, the modulator 48 converts the predetermined dc level for the R-Y signal to a predetermined R-Y rest frequency and the predetermined dc level (including offset) for the B-Y signal to a predetermined B-Y rest frequency. (The instantaneous color signal voltages, representing the color information in the signal, are converted to corresponding instantaneous frequencies that vary within a given range—the frequency deviation). The respective values of the rest frequencies constitute identifiers of the respective color difference signals (such knowledge is of use, for example, in an fm detector in a video receiver, which forms no part of this invention and is not shown or further described). The modulated signal is filtered in a band pass filter 50, from which it may be summed with a modulated signal containing the luminance.

The luminance signal is provided by the decoder 22 to an equalization network 52 to compensate for delays in the chrominance signal path relative to the luminance signal path so that both signals will eventually be summed in correct time relation. The luminance signal is low pass filtered (a filter 54) and preemphasized (a preemphasis circuit 56) prior to being clamped in a clamping circuit 58. The clamped luminance signal modulates the frequency of an rf carrier applied to a frequency modulator 60. The output of the modulator 60 is confined to a selected passband by a band pass filter 62 and presented to an rf summer 64 for summing with the line sequential signal from the band pass filter 50. (The proportionality constants of the summation are represented by the summing resistors 65 and 66).

The composite line sequential signal is amplified by a head driver 67 and recorded on the disk 14 by a recording head 68. The disk 14 is rotated past the stationary head 68 by a motor 69; the rate of rotation of the motor 69 is held constant at 3600 rpm by a motor drive 70 so that a complete field may be recorded upon one revolution of the disk 14. A head positioner 71 selects the position of the recording head 68, thereby permitting many tracks (i.e., video fields) to be recorded on the disk 14. The operation of the head positioner 71 and the motor driver 70 is managed by a controller 72 (typically a programmed) microprocessor dedicated to this task, or a part of a programmed microprocessor controlling the overall video recorder).

Figure 2:
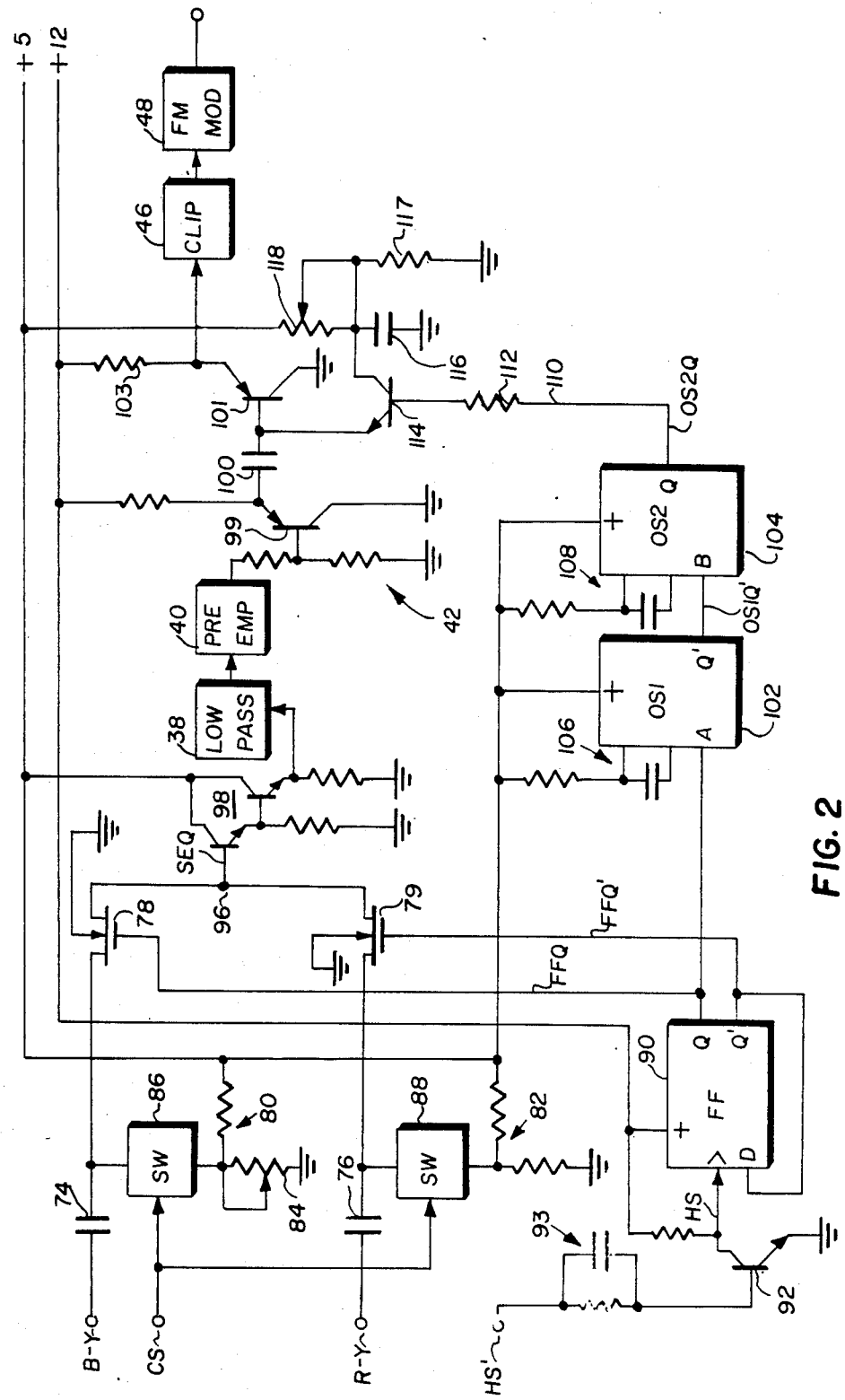
FIG. 2 is a circuit diagram of portions of the block diagram shown by FIG. 1 showing a preferred schematic diagram of a clamping circuit for establishing offset dc levels according to the invention.

The portion of the block diagram of FIG. 1 within the broken line 73 is reproduced in FIG. 2, in part as like-numbered circuit blocks and in part as a more detailed circuit schematic diagram. The circuit of FIG. 2 will also be described with regard to the signals at various circuit points, as shown by the waveform and timing diagrams of FIG. 3. The R-Y and B-Y color difference signals produced by the decoder 22 and shown in FIG. 3 differ, other than as to their color information content, by their peak-to-peak voltages. The R-Y signal has a peak-to-peak value of 1 volt while the B-Y signal has a peak-to-peak value of 0.71 volt. The respective color difference signals have active line intervals and respective quiescent intervals A and B (see FIG. 3) separating the active intervals. Each quiescent interval corresponds to the horizontal blanking period during which the composite synchronizing pulse of the luminance signal occurs. (A composite sync pulse does not occur in the color difference signal.)

The two color difference signals are ac coupled from the decoder 22 through respective clamping capacitors 74 and 76 to respective switching transistors 78 and 79 (which are shown as enhancement mode MOSFETs). In order to have the two ac signals across the capacitors 74 and 76 resolve about dc levels, the selected dc levels are set by respective divider networks 80 and 82. These networks divide down the voltage from a five volt supply line. The dc level of the B-Y color difference signal is, furthermore, set at a selected offset voltage with respect to the R-Y signal by adjustment of a potentiometer 84. (The particular offset used is about 107 millivolts.) The dc levels are set during the intervals A and B (see FIG. 3) by corresondingly opening respective switches 86 and 88 (which are, for example, part of a CMOS quad bilateral switch 4066) during a portion of these intervals. The control pins of the switches 86 and 88 are connected to the composite sync signal CS (which is stripped from the luminance signal). When signal CS becomes HIGH, the switches are closed and the coupling capacitors 74 and 76 are driven to the respective clamping voltages as determined by the divider networks 80 and 82. The respective color difference signals then tend to resolve about these dc levels rather than the zero axis.

The switching transistors 78 and 79 conduct when their respective gates are brought HIGH by the signals from the complementary outputs of a flip-flop 90 (which is, for example, one-half of a CMOS dual D flip-flop device number 4013). Connected to divide its input by two, the flip flop 90 produces the FFQ waveform for the B-Y switch 78 and the FFQ' waveform for the R-Y switch 79. The flip flop 90 triggers on the rising edge of a signal HS applied to its clock input from an inverting transistor 92. The base of the transistor 92 is driven by the signal HS' from the sync separator 24 (FIG. 1). An RC network 93 is used to provide bias and increase the speed of the transistor 92, making it turn off rapidly in order to get a squarer wave output. The color sequential signal SEQ, which consists of an alternating sequence of R-Y and B-Y signals, appears at the junction point 96 and from there is buffered through a Darlington transistor circuit 98 to the low pass filter 38 and the preemphasis circuit 40. The preemphasized line sequential signal is provided to a transistor 99 connected as an emitter follower and then coupled through a capacitor 100 to an inverting transistor 101 before reaching the clippping circuit 46 and the fm modulator 48.

If the clipping circuit 46 and the modulator 48 are to operate properly on the line sequential signal, it is important that the color difference signals be set at predetermined dc levels with correspond to the desired rest frequencies of the modulator. This occurs according to the invention by charging the coupling capacitor 100 to a selected dc level for every other line. Though alternating lines ar therefore "unclamped", the desired offset voltage between the R-Y and B-Y signals is maintained and thereby the desired dc level for both of the color sequential signals is established.

An alternate line clamping pulse is obtained from a pair of monostable (one-shot) multivibrators 102 and 104 (e.g., a dual one-shot device number 74LS423). The duration of the respective one-shot pulses are determined by respective RC timing networks 106 and 108. The first one-shot 102 is triggered on its A input pin by the falling edge of the input waveform FFQ. The resulting signal on the Q' output pin is shown by the waveform OS1Q' in FIG. 3. This signal is provided to the B input pin of the second one-shot 104 and triggers it on the rising edge of its waveform. This causes the generation of a clamping pulse on the line 110 (depicted by the waveform OS2Q) which is delayed by an amount D (see FIG. 3) relative to the onset of the composite synchronizing pulse; the clamping pulse therefore occurs later in the interval A preceding the R-Y color difference signal. This delay is useful for letting the preceding B-Y color difference signal settle down after preemphasis. Nonetheless, the clamping pulse is within the interval A and therefore suitable for clamping the R-Y color difference signal to a reference dc level.

The clamping pulse is applied through a resistor 112 to the base of a switching transistor 114. Meanwhile, a capacitor 116 has been charged to a selected dc level through a potentiometer 118 connected to the five volt supply line. The capacitor 116 sets the voltage upon the collector of the transistor 114. With the clamping pulse on the line 110, the transistor 114 conducts and drives the dc level on the capacitor 100 to the clamping level set by the capacitor 116 and the potentiometer 118. The line sequential signal across the capacitor 100 then resolves about the dc level impressed upon the capacitor 100. Since the line sequential signal applied to the capacitor 100 contains the offset characteristic of the respective color difference signals, the dc level impressed upon the capacitor 100 for the R-Y color difference signal establishes the dc level for itself and later for the B-Y color difference signal when it is applied to the capacitor 100. The resultant color sequential signal, now at its proper dc level, is in condition for cliping and fm modulation. This signal is represented by the waveform SEQ in FIG. 3.

The capacitor 100 must be charged very quickly to the stored dc level on the capacitor 116 since the switching transistor 114 is only open for the duration of the clamping pulse. During this period, the charging path includes the capacitor 100, the conducting transistor 114 and the parallel resistance of the potentiometer 118 and a resistor 117. The values of these resistances can be made sufficiently low such that, for a given capacitance of the capacitor 100, the time constant for the charging path is very short. Conversely, once the switching transistor 114 is cut off, the capacitor 100 must hold its dc level through the duration of two lines without significantly decaying. This means the discharge path through the transistor 101 and its emitter resistor 103 must have a very long time constant. The input resistance seen through the base of the transistor 101, which is connected as en emitter follower, is the beta of the transistor times the value of the emitter resistor 103. This input resistance can be made sufficiently high that the same capacitance value of the capacitor 100 will provide a long time constant through this path.

While the preferred embodiment shows clamping to occur to the line sequential signal at the onset of its R-Y component, it is also possible to clamp at the onset of the B-Y component (rather than the R-Y component). As heretofore explained, the clamping circuits 26 and 28 establish an offset voltage between color difference signals which carries through subsequent proessing stages. The dc level set by the clamping circuits 26 and 28 for each color difference signal, on the other hand, will not carry through. Consequently, the dc levels set by the clamping circuits 26 and 28 need not be the same as the dc levels finally established by the clamping circuit 42 as long as the offset voltage is the finally required voltage.

The invention has been described in detail with particular reference to a preferred embodiment thereof, but it will be understood that further variations and modifications can be effected within the spirit and scope of the invention.

What is claimed is:

1. A video circuit for processing color signals in a line sequential video system, said circuit comprising:
   means for generating a pair of color video signals;

means for setting the dc voltage level of one color signal relative to the other color signal such that an offst voltage exists between them;

means for combining said offset color video signals into a line sequential signal;

means for ac coupling said line sequential signal between stages of the circuit whereby its dc level is lost; and means for reestablishing a dc voltage level for said line sequential signal by clamping one of said color video signals to a predetermined dc level thereby utilizing the offset voltage between it and the other color video signal to set the other color video signal to another predetermined dc level.

2. A video circuit for processing color difference signals in a line sequential video system wherein the respective dc voltage levels serve to identify respective color difference signals, said circuit comprising:

means for generating first and second color difference signals from the luminance and chrominance components of a composite television signal;

means for establishing a first dc voltage level for said first color difference signal;

means for establishing a second dc voltage level for said second color difference signal, said second dc level offset a selected amount from said first dc level and serving to distinguish said second color difference signal from said first color difference signal;

means for forming a line sequential signal by alternately switching said color difference signals to one or more subsequent signal processing stages;

a clamping circuit located between selected stages for setting the dc level of said line sequential signal to a value corresponding to said first and second dc levels; and means for actuating said clamping circuit to clamp said line sequential signal at the onset of every other color difference signal.

3. The circuit as claimed in claim 2 in which said clamping circuit comprises:

a coupling capacitor for coupling said line sequential signal between said selected stages;

a charging capacitor connected to a source of charging voltage so as to charge to a value corresponding to either said first or second dc level; and a switching transistor connected between said coupling capacitor and said charging capacitor.

4. The circuit as claimed in claim 3 in which said means for actuating said clamping circuit comprises a one-shot multivibrator for supplying a trigger pulse to said switching transistor at the onset of every other color difference signal.

5. A video circuit for processing color difference signals in a line sequential video systems wherein the respective dc levels serve to identify respective color difference signals, said circuit comprising:

means for generating first and second color difference signals from a composite color television signal;

means for establishing an offset voltage between the respective blanking levels of said first and second color difference signals;

means for forming a line sequential signal by alternately switching said color difference signals line-by-line.

a clamping circuit for establishing the respective dc blanking levels of said color difference signals constituting said line sequential signal; and means for actuating said clamping circuit to clamp the blanking level of said line sequential signal at the onset of every other color difference signal.

* * * * *